US00RE36692E

United States Patent [19]

Gupta et al.

[11] E Patent Number: Re. 36,692

[45] Reissued Date of Patent: May 16, 2000

[54] HEAT TREATMENT PROCESS FOR ALUMINUM ALLOY SHEET

[75] Inventors: Alok Kumar Gupta; Michael J. Wheeler, both of Kingston, Canada; Michael Jackson Bull, Brighton, Mich.; Pierre Henri Marois, Kingston, Canada

[73] Assignee: Alcan International Limited, Montreal, Canada

[21] Appl. No.: 09/113,619

[22] Filed: Jul. 10, 1998

Related U.S. Patent Documents

Reissue of:

[64] Patent No.: 5,728,241
Issued: Mar. 17, 1998
Appl. No.: 08/764,983
Filed: Dec. 13, 1996

[63] Continuation of application No. 08/683,041, Jul. 15, 1996, abandoned, which is a continuation of application No. 08/301,172, Sep. 6, 1994, abandoned, which is a continuation-in-part of application No. 08/097,840, Jul. 28, 1993, abandoned.

[51] Int. Cl.[7] ..... C22F 1/04

[52] U.S. Cl. ..... 148/694; 148/698; 148/700; 148/702

[58] Field of Search ..... 148/693, 694, 148/697, 698, 700, 702

[56] References Cited

U.S. PATENT DOCUMENTS

| | | | |
|---|---|---|---|
| 3,135,633 | 6/1964 | Hornus | 148/702 |
| 4,808,247 | 2/1989 | Komatsubara et al. | 148/693 |
| 5,460,666 | 10/1995 | Fujita et al. | 148/693 |
| 5,616,189 | 4/1997 | Jin et al. | 148/693 |

FOREIGN PATENT DOCUMENTS

| | | |
|---|---|---|
| 0051549A1 | 5/1982 | European Pat. Off. . |
| 0616044A2 | 9/1994 | European Pat. Off. . |
| 2209457 | 8/1990 | Japan . |
| 5044000 | 2/1993 | Japan . |
| 544000 | 2/1993 | Japan . |
| 5279822 | 10/1993 | Japan . |

*Primary Examiner*—George Wyszomierski
*Attorney, Agent, or Firm*—Cooper & Dunham LLP

[57] ABSTRACT

A process of producing solution heat treated aluminum alloy sheet material comprises subjecting hot- or cold-rolled aluminum alloy sheet to solution heat treatment followed by quenching and, before substantial age hardening has taken place, subjecting the alloy sheet material to one or more subsequent heat treatments involving heating the material to a peak temperature in the range of 100° to 300° C. (preferably 130°–270° C.), holding the material at the peak temperature for a period of time less than about 1 minute, and cooling the alloy from the peak temperature to a temperature of 85° C. or less. The sheet material treated in this way can be used for automotive panels and has good a good "paint bake response", i.e. an increase in yield strength from the T4 temper to the T8X temper upon painting and baking of the panels.

12 Claims, 1 Drawing Sheet

HEAT TREATMENT PROCESS FOR ALUMINUM ALLOY SHEET

Matter enclosed in heavy brackets [ ] appears in the original patent but forms no part of this reissue specification; matter printed in italics indicates the additions made by reissue.

This is a continuation of application Ser. No. 08/683,041 filed Jul. 15, 1996 which is a continuation of 301,172, filed Sep. 6, 1994, which is a continuation-in-part of Ser. No. 097,840, filed Jul. 28, 1993, all abandoned.

BACKGROUND OF THE INVENTION

I. Field of the Invention

This invention relates to a heat treatment process for aluminum alloy sheet material that improves the paint bake response of the material.

II. Description of the Prior Art

Aluminum alloy sheet is being used more extensively nowadays as a structural and closure sheet material for vehicle bodies as automobile manufacturers strive for improved fuel economy by reducing vehicle weight. Traditionally, aluminum alloy is either direct chill cast as ingots or continuous cast in the form of a thick strip material, and then hot rolled to a preliminary thickness. In a separate operation, the strip is then cold rolled to the final thickness and wound into coil. The coil must then undergo solution heat treatment to allow strengthening of the formed panel during paint cure.

Solution heat treatment involves heating the metal to a suitably high temperature (e.g. 480°–580° C.) to cause dissolution in solid solution of all of the soluble alloying constituents that precipitated from the parent metal during hot and cold rolling, and rapid quenching to ambient temperature to create a solid supersaturated solution (see, for example, "Metallurgy for the Non-Metallurgist", published in 1987 by the American Society for Metals, pp 12-5, 12-6). Then the metal is precipitation hardened by holding the metal at room temperature (or sometimes at a higher temperature to accelerate the effect) for a period of time to cause the spontaneous formation of fine precipitates. The metal may then additionally undergo cleaning, pretreatment and prepriming operations before being supplied to a vehicle manufacturer for fabrication into body panels and the like.

It is highly desirable that the alloy sheet, when delivered to the manufacturer, be relatively easily deformable so that it can be stamped or formed into the required shapes without difficulty and without excessive springback. However, it is also desirable that the sheets, once formed and subjected to the normal painting and baking procedure, be relatively hard so that thin sheet can be employed and still provide good dent resistance. The condition in which the alloy sheet is delivered to the manufacturer is referred to as T4 temper and the final condition of the alloy sheet after the paint/bake cycle (which can be simulated by a 2% stretch and baking at 177° C. for 30 minutes) is referred to as T8X temper. The objective is therefore to produce alloy sheet that has relatively low yield strength in T4 temper and high yield strength in T8X temper.

A drawback of the conventional solution heat treatment followed by the conventional age hardening procedure is that the so-called "paint bake response" (the change in yield strength from a desirable T4 temper to a desirable T8X temper caused by painting and baking) may suffer.

Another drawback of certain prior art solution heat treatment processes is that they require the metal to be treated in coiled form and, as a result (because of the large bulk of metal that has to be treated at one time), in a batch operation where heat treatment conditions are less controlled, holding times are longer, precise and uniform temperature control is difficult to obtain and high heating and cooling rates cannot be achieved.

There is therefore a need for improved treatments of aluminum alloy sheet material that can enhance the paint bake response (the T4 to T8X strength increase) and that preferably can be carried out continuously, i.e. on a section of the moving sheet as the sheet is processed in a coil to coil treatment line.

Japanese patent publication JP 5-44,000, assigned to Mitsubishi Aluminum KK and published on Feb. 23, 1993 discloses a reversion treatment for aluminum sheet whereby the T4 yield strength is lowered (for better formability) after a long period of natural age hardening. Following, a solution heat treatment, quench and natural age hardening, the aluminum sheet is heated to 200°–260° C. and held at the peak metal temperature for 3–80 seconds.

Japanese patent publication JP 5-279,822 assigned to Sumitomo Light Metal Industries Co. and published in Oct. 28, 1993 discloses a heat treatment of aluminum alloy to improve the paint bake response. Following solution heat treatment and quenching, the aluminum alloy sheet is heated to 15°–120° C. within 1 day for one hour or less, and is then further heated to 200°–300° C. for one minute or less.

Japanese patent publication JP 2-209,457 assigned to Kobe Steel Ltd. and published on Aug. 20, 1990 discloses a modification to a conventional continuous anneal solution heat treatment line to improve the paint bake response of aluminum sheet material. A reheating device is added to the end of the line to reheat the aluminum sheet immediately following solution heat treatment and quenching.

These references do not, however, result in the desired degree of improvements.

SUMMARY OF THE INVENTION

An object of the present invention is to provide a solution heat treated aluminum alloy sheet material that has a good paint bake response when subjected to conventional paint and bake cycles.

Another object of the invention is to provide a metal stabilizing heat treatment procedure that can be carried out on aluminum sheet on a continuous basis following solution heat treatment without detrimental effect on the desired T4 and T8X tempers of the material.

Another object of the invention is to reduce the detrimental effects of the immediate post solution heat treating natural age hardening of aluminum alloy sheet material has on the "paint bake response" of the metal.

Yet another object of the invention is to produce an aluminum alloy sheet material that has a low yield strength in T4 temper and a high yield strength in T8X temper.

According to the present invention, there is provided a process of producing solution heat treated aluminum alloy sheet material, which comprises subjecting hot- or cold-rolled aluminum alloy sheet to solution heat treatment followed by quenching and, before any substantial natural age hardening has taken place, subjecting the alloy sheet material to at least one subsequent heat treatment involving heating the material to a peak temperature in the range of 100° to 300° C., (preferably in the range of 130°–270° C.), holding the material at the peak temperature for a period of time less than about 1 minute, and cooling the alloy from the peak temperature to a temperature of 85° C. or less.

The present invention can be carried out on any precipitation hardening aluminum alloy, e.g. Al-Mg-Si or Al-Mg-Si-Cu.

The subsequent heat treatment (or the first such treatment when more than one is employed) should preferably be started within 12 hours of the quenching step terminating the solution heat treatment to avoid reduction of the yield strength of the metal in its eventual T8X temper. More preferably, the subsequent heat treatment is carried out within one hour of the quenching step and, in continuous processes, the time delay is usually reduced to a matter of seconds.

The resulting heat treated material is generally strong enough to eliminate (if desired) the need for natural ageing (i.e. holding at room temperature for 48 hours or more) before being subjected to a fabrication operation, e.g. being cut to length and/or formed into automotive stampings. The material may be up to 10% lower in strength in the T4 temper (after one week of natural ageing) and up to 50% stronger in the T8X temper than conventionally produced sheet material made from an identical alloy. Moreover, the process can if desired be integrated into the conventional drying, pre-treatment cure and primer cure operations that are part of the cleaning, pretreatment and preprime operations, respectively, necessary to produce a pre-painted sheet product. Alternatively, the process of the present invention can be applied to bare sheet. In either case, the heat treatment of the present invention can be integrated with the conventional solution heat treatment of the material and used to fabricate either bare or cleaned, pretreated and preprimed material in one continuous operation.

In the present application, as will be apparent from the disclosure above, reference is made to the terms T4 temper and T8X temper. For the sake of clarity, these terms are described in some detail below.

The temper referred to as "T4" is well known (see, for example, "Aluminum Standard and Data", (1984), page 11, published by the Aluminum Association). The aluminum alloys used in this invention continue to change tensile properties after the solution heat treatment procedure and the T4 temper refers to the tensile properties of the sheet after such changes have taken place to a reasonable degree, but before changes brought about by conventional painting and baking procedures.

The T8X temper may be less well known, and here it refers to a T4 temper material that has been deformed in tension by 2% followed by a 30 minute treatment at 177° C. to represent the forming plus paint curing treatment typically experienced by automotive panels.

The term "paint bake response" as used herein means the change in tensile properties of the material as the material is changed from the T4 temper to the T8X temper during actual painting and baking. A good paint bake response is one that maximizes an increase in tensile yield strength during this process.

DETAILED DESCRIPTION OF THE PREFERRED EMBODIMENTS

Figure 1:
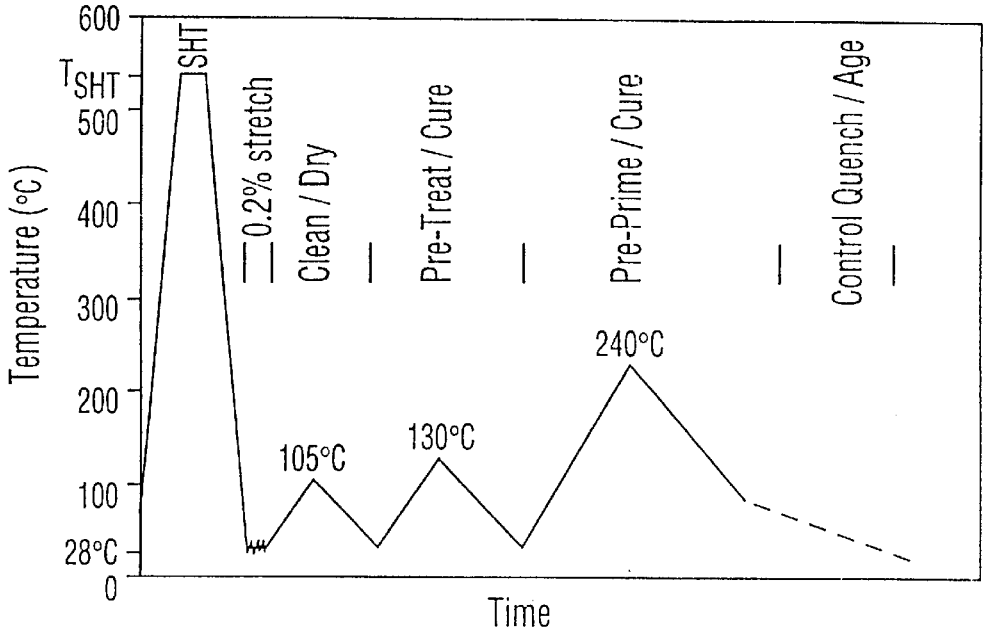
FIG. 1 is a schematic diagram representing a graph of temperature versus time showing a simulation of a continuous heat treatment and anneal (CASH) line incorporating reheat stabilization steps according to the present invention.

As already stated, the process of the present invention introduces at least one subsequent heat treatment (i.e. a low temperature reheating step) immediately or shortly following a standard solution heat treatment and quenching of an aluminum alloy sheet.

In order to obtain the desired effect of the present invention, the temperature of the sheet material after the quenching step terminating the solution heat treatment should most preferably be about 60° C. or lower. The sheet material is then subjected to one or a series of subsequent heat treatments in which the metal is heated to a temperature in the range of 100° to 300° C. (preferably 130° to 270° C. and then cooled). In the (or in each) heat treatment, the metal is heated directly to a peak temperature and is maintained at the peak temperature for a very short dwell time and is then cooled directly to below a certain final temperature (such treatments being referred to as temperature "spiking" since the profile of a temperature versus time graph for such a process reveals a generally triangular pointed, or slightly blunted, "spike"). The dwell time at the maximum temperature is preferably one minute or less, more preferably 5 seconds or less, and most preferably 1 second or less. This procedure has the effect of maintaining good ductility of the metal in the T4 temper while maximizing the paint bake response.

In the (or in each) subsequent heat treatment, the sheet material is preferably heated directly to the peak temperature falling within the stated range at a rate of 10° C./minute or more (preferably at a rate falling within the range of 5° to 10° C./second), and is then cooled directly from the peak temperature to a temperature in the range of 55° to 85° C. at a rate of 4° C./second or more (more preferably 25° C./second or more).

The reason why the present invention is effective in maintaining a good paint bake response is not precisely known, but it is theorized that the following mechanism is involved. During the solution heat treatment, the second phase particles formed during hot and cold rolling are redissolved above the equilibrium solvus temperature (480° to 580° C.) and rapid cooling of the material after this during the quenching step suppresses re-precipitation of the solutes. At this stage, the material is supersaturated with solutes and excess vacancies. The supersaturated solid solution is highly unstable and, if conventional natural ageing is carried out, it decomposes to form zones and clusters which increase the strength of the material but significantly decreases the strength in T8X temper. The use of the low temperature subsequently heat treatment(s) of the present invention is believed to create stable clusters and zones which promote precipitation of the hardening particles throughout the parent metal matrix and improve the strength of the alloy in T8X temper. The degree of improvement actually obtained depends on the alloy composition and the peak temperature (s) employed.

It has been found that, in some cases, natural ageing following the subsequent heat treatment(s) results in some loss of strength in the T8X temper. This can be reduced or eliminated by carrying out a preageing step following the subsequent heat treatments mentioned above. This preageing is preferably carried out by cooling the material from a temperature in the range of 55° to 85° C. at a rate of less than 2° C. per hour following the (or the final) subsequent heat treatment. In such a case, therefore, the (or the final) subsequent heat treatment would involve cooling the metal to a temperature in the range of 55° to 85° C. at the stated rate of 4° C./second or more (more preferably 25° C./second or more), followed by cooling the metal to ambient at a rate less than 2° C./hour.

The use of just a single subsequent heat treatment is usually sufficient to achieve the desired result, but it is then preferable to heat the metal to a peak temperature falling in the upper part of the stated range, i.e. to a temperature in the range of 190° to 300° C.

More preferably, more than one subsequent low temperature heat treatment step is employed, e.g. 2 to 4. Most conveniently, there are three such treatments that are incorporated into the cleaning/drying, pre-treat/cure and preprime/cure procedures conventionally carried out during the fabrication of prepainted coil product. These procedures involve continuously cleaning and pretreating the material prior to painting and curing. In the present invention, instead of using the conventional temperatures and heating and cooling rates employed in these known steps, the temperatures and rates described above are substituted. This can be done without any detrimental effect on the cleaning/drying, pre-treat/cure and preprime/cure procedures, since the temperatures and rates employed in the present invention are compatible with these known steps.

The required heat treatments can be carried out by passing the cold rolled material through an integrated Continuous Anneal Solution Heat (CASH) line (also known as a Continuous Anneal Line (CAL)) incorporating the surface pretreatment stages mentioned above that provide the required stabilization reheat step or steps. Thus the procedure, in a preferred embodiment may consist of the following stages:

(1) Solution heat treatment/rapid cooling (2) Levelling (3) Clean/dry (4) Pre-treatment/cure (5) Pre-prime/cure (6) Coil cooling.

Any one or more of steps (3)–(5) above may incorporate a stabilization heat treatment according to the invention.

A typical temperature profile showing such a series of steps is shown in FIG. 1 of the accompanying drawings as an example. The first temperature peak from the left in this drawing shows a solution heat treatment (SHT) and rapid quench to room temperature (a temperature below about 60° C.). The metal sheet is then subjected to an optional stretch of no more than 2% and usually about 0.2%, which takes a few seconds, as a routine levelling operation. This is carried out by stretching the strip over specially situated rolls to remove waviness. Three subsequent heat treatments according to the present invention are then carried out in succession during which the metal is heated at the peak temperatures (105° C., 130° C. and 240° C.) for less than one second. In a final stage shown in FIG. 1, the sheet is subjected to a controlled preaging step preferably carried out by controlled cooling from a temperature of about 85° C. at a rate less than 2° C./hour. In a commercial operation, this step would not in fact be part of the continuous process and would take place off the line after the strip had been recoiled.

As can be seen from the notations used in FIG. 1, the stabilization heat treatments are incorporated into the conventional clean/dry, pre-heat/cure and preprime/cure steps. The final heat treatment is represented as a final preageing step.

The invention is illustrated in more detail by the following Examples which are not intended to limit the scope of the invention.

EXAMPLE 1

The alloys shown in Table 1 below were used in this Example. These alloys were in the form of sheet having a thickness of 0.039 inches.

TABLE 1

NOMINAL COMPOSITIONS OF DIFFERENT ALLOYS EMPLOYED (IN WT. %)

| ALLOYS | CU | FE | MG | MN | SI | TI |
|---|---|---|---|---|---|---|
| X 611* | <0.01 | 0.15 | 0.77 | <0.01 | 0.93 | 0.06 |
| AA 6111 | 0.78 | 0.11 | 0.81 | 0.16 | 0.60 | 0.08 |
| AA 6009 | 0.33 | 0.23 | 0.49 | 0.31 | 0.80 | |
| AA 6016 | 0.10 | 0.29 | 0.40 | 0.08 | 1.22 | 0.01 |
| AA 2036 | 2.2 | 0.15 | 0.18 | 0.10 | 0.18 | |
| KSE* | 1.10 | 0.15 | 1.22 | 0.08 | 0.26 | |
| KSG* | 1.52 | 0.15 | 1.22 | 0.08 | 0.33 | |

*Experimental Alloys

These alloys were initially in the solution heat treated and naturally aged condition and tensile samples were prepared from the alloys. The samples were re-solution heat treated at 560° C. for 30 seconds and were then rapidly cooled. The tensile properties of the solution heat treated material were determined in T4 and T8X tempers after one week of natural ageing. For comparison purposes, the properties were also determined immediately after the solution heat treatment and quenching.

Figure 2:
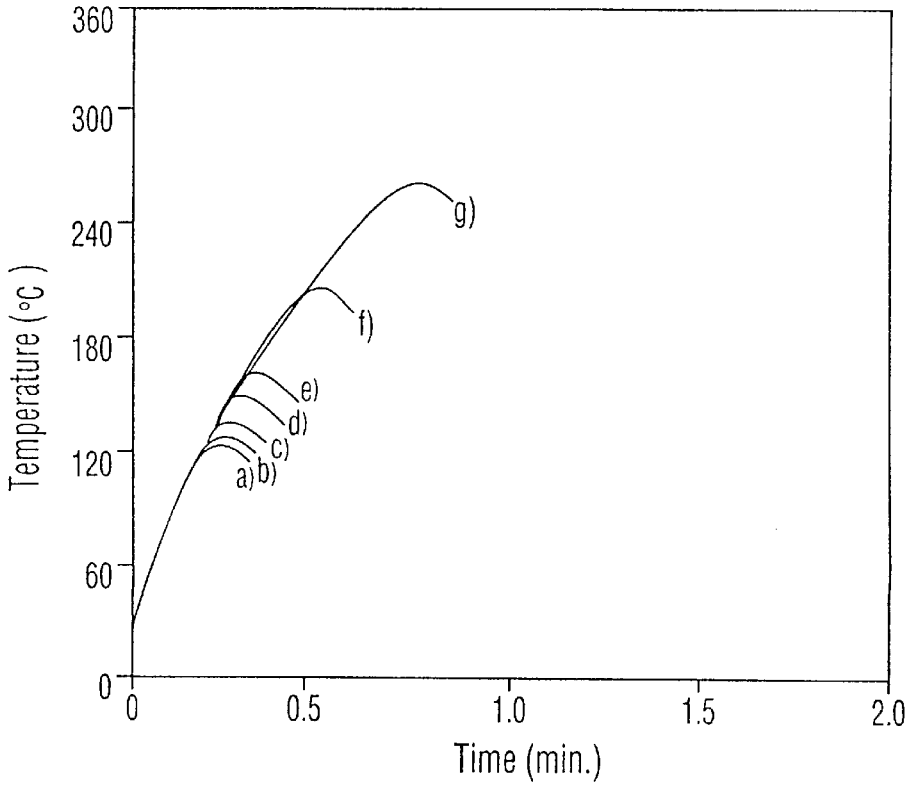
FIG. 2 is a graph showing temperature versus time profiles obtained as described in the Examples provided below.

To study the effects of low temperature heat treatments according to the present invention, the re-solution heat treated samples were immediately exposed to a temperature spike between 100° and 270° C. in a conveyor belt furnace and rapidly cooled to below 100° C. FIG. 2 shows the heating profiles, (a) to (g), which were typically used in the treatment. These profiles were obtained by heating the sheet in a conveyor belt furnace set at 320° C. The profiles (a) to (g) were obtained by changing the belt speeds as in the following (expressed in feet/minute): (a) 22.3; (b) 20.5; (c) 17.5; (d) 14.5; (e) 11.5; (f) 8.5; and (g) 5.5. The delay between the exposures to the thermal spikes was kept to a minimum. In order to compare the stability of the material after different heat treatments, tensile tests were conducted in T4 and T8X tempers both with and without one week of natural ageing. Some samples were given an additional preage treatment in the range of 55° to 85° C. in a furnace for 8 hours followed by cooling to ambient temperature. This was to simulate in the laboratory with test coupons the practical situation of coiling strip at a temperature of 55°–85° C. and then allowing the coils to cool naturally at a rate of less than 2° C./hour.

Tensile tests were performed on duplicate samples in various tempers using a robot operated INSTRON® testing machine. The strength values were found to be accurate within ±1%, while the total elongation (EL%) could vary by ±5%.

SOLUTION HEAT TREATED AND NATURALLY AGED MATERIALS

The tensile properties of the materials in as-is, one week naturally aged (T4) and T8X (2% stretch, followed by 30 minutes at 177° C.) are listed in Table 2.

TABLE 2

TENSILE PROPERTIES OF THE SOLUTION HEAT TREATED AND ONE CYCLE EXPOSED MATERIALS

| | | NO NATURAL AGEING | | | | ONE WEEK NATURAL AGEING | | | |
|---|---|---|---|---|---|---|---|---|---|
| | | AS-IS | | T8X | | T4 | | T8X | |
| ALLOY | PMT (° C.) | YS (KSI) | % EL | YS (KSI) | % EL | YS (KSI) | % EL | YS (KSI) | % EL |
| AA 6111 | CONTROL | 8.9 | 29 | 42.4 | 14 | 20.3 | 27 | 29.9 | 23 |
| | 130 | 9.3 | 31 | — | — | 18.0 | 27 | 30.8 | 21 |
| | 240 | 14.7 | 24 | 45.7 | 13 | 20.8 | 25 | 38.8 | 18 |
| AA 6016 | CONTROL | 11.2 | 29 | 28.1 | 18 | 17.0 | 32 | 26.1 | 24 |
| | 130 | 12.5 | 29 | 32.1 | 17 | 15.2 | 29 | 30.6 | 24 |
| AA 6009 | CONTROL | — | — | — | — | 17.9 | 27 | 25.7 | 21 |
| | 240 | 8.6 | 26 | 38.7 | 14 | 16.4 | 27 | 28.9 | 19 |
| KSE | CONTROL | — | — | — | — | 19.0 | 25 | 26.2 | 25 |
| | 240 | 12.2 | 26 | 29.8 | 20 | 15.9 | 26 | 29.2 | 21 |

NOTE:
IN THE ABOVE TABLE, PMT MEANS PEAK METAL TEMPERATURE, YS MEANS YIELD STRENGTH, KSI MEANS KILOPOUNDS/SQUARE INCH, and % EL MEANS PERCENT ELONGATION In all cases, the properties of the control samples (see Table 2) are typical of the material when conventionally fabricated. The as-is AA6111 material showed 8.9 ksi YS and this increased by about 375% to 42.4 ksi in T8X temper. After one week natural ageing, the YS values in T4 and T8X tempers were 20.3 and 29.9 ksi, respectively. It should be noted that natural ageing for one week increased the yield strength in T4 temper by about 130% and decreased T8X response by about 25%.

The AA6016 material showed 11.2 and 28.1 ksi in yield strength in the as-is and T8X tempers, respectively. After one week of natural ageing, like AA6111, the yield strength in T4 temper increased to 17 ksi, while the T8X value decreased to 26.1 ksi. It should be noted, however, that the extent of the loss in strength due to natural ageing was much less in this case compared to that of the AA6111 material.

The tensile properties of the other alloys also show trends similar to that shown by the AA6016 and AA6111 materials.

EFFECT OF THERMAL EXPOSURE ON THE PROPERTIES OF SOLUTION HEAT TREATED MATERIAL ONE CYCLE

Table 2 above also lists the results of tensile tests performed on AA6111, AA6009 and KSE materials after being exposed to a temperature spike (PMT) at 130° or 240° C. in a conveyor belt furnace. As expected, the yield strength value in the as-is condition and T8X tempers increased due to exposure to the thermal spike at 130° or 240° C. In all cases, except for AA6111 spiked at 240° C., the yield strength values of the one week naturally aged material were about 10% lower in T4 and slightly better in T8X compared to the control material.

TWO CYCLES

The effect of two cycles exposure on freshly solution heat treated material was studied on AA6111 and AA6016 materials. Table 3 below summarizes the results of the tensile tests performed on these materials under different aged conditions.

TABLE 3

EFFECT OF ONE WEEK HOLD ON THE TENSILE PROPERTIES OF THE SOLUTION HEAT TREATED PLUS TWO CYCLES STABILIZED MATERIALS

| | | NO NATURAL AGEING | | | | ONE WEEK NATURAL AGEING | | | |
|---|---|---|---|---|---|---|---|---|---|
| | | T4 | | T8X | | T4 | | T8X | |
| ALLOY | PMT (° C.) | YS (KSI) | % EI | YS (KSI) | % EI | YS (KSI) | % EI | YS (KSI) | % EI |
| AA 6016 | NONE | 11.2 | 29 | 28.1 | 18 | 17.0 | 32 | 26.1 | 24 |
| | 130/240 | 10.6 | 30 | 35.0 | 16 | 16.2 | 29 | 32.6 | 21 |
| | 150/150 | 12.2 | 28 | 33.0 | 17 | 14.4 | 31 | 32.8 | 23 |
| AA 6111 | NONE | 8.9 | 29 | 42.4 | 14 | 20.3 | 27 | 29.9 | 23 |
| | 130/240 | 15.3 | 29 | 44.4 | 17 | 20.2 | 26 | 36.7 | 20 |
| | 150/150 | 11.1 | 28 | 41.1 | 16 | 19.0 | 27 | 33.7 | 22 |

Once again, as in the case of the one cycle exposures, this treatment partially stabilizes the AA6111 strength, and the final values in the T8X temper are generally better than those of the control and equal or better than the one cycle exposed material. It should be noted that the choice of the spike temperature is quite significant in terms of the T8X response for the AA6111 material. Generally, the choice of higher temperature appears to be more important than the number of thermal spikes.

The AA6016 material behaved slightly differently compared to AA6111. The alloy, depending on the temperature of the thermal spikes, gave different combinations of strength in T4 and T8X tempers. For example, when the material was spiked at 130° and 240° C., respectively, then the yield strength in the T4 condition was close to that in the as-is condition, but about 7% higher in the T8X condition when compared to the control material. After one week of natural ageing, the yield strength increased in the T4 temper, but decreased slightly (about 3 ksi) in the T8X temper.

THREE CYCLES

Table 4 below summarizes the results of the tensile tests performed on materials spiked three times immediately after solution heat treatment. Generally, the use of an additional cycle does not change the mechanical properties of the materials to any significant extent (compare data in Tables 3 and 4).

TABLE 4

EFFECT OF ONE WEEK HOLD ON THE TENSILE PROPERTIES OF THE SOLUTION HEAT TREATED PLUS THREE CYCLES STABILIZED MATERIALS

| | | NO NATURAL AGEING | | | | ONE WEEK NATURAL AGEING | | | |
|---|---|---|---|---|---|---|---|---|---|
| | | T4 | | T8X | | T4 | | T8X | |
| ALLOY | PMT (° C.) | YS (KSI) | % EI | YS (KSI) | % EI | YS (KSI) | % EI | YS (KSI) | % EI |
| AA 6016 | CONTROL | 11.2 | 29 | 28.1 | 18 | 17.0 | 32 | 26.1 | 24 |
| | 130/130/240 | 11.2 | 35 | 35.2 | 16 | 16.2 | 30 | 31.2 | 22 |
| | 150/150/150 | 12.6 | 31 | 32.7 | 20 | 14.7 | 33 | 32.4 | 21 |

TABLE 4-continued

EFFECT OF ONE WEEK HOLD ON THE TENSILE PROPERTIES OF THE SOLUTION HEAT TREATED PLUS THREE CYCLES STABILIZED MATERIALS

| | | NO NATURAL AGEING | | | | ONE WEEK NATURAL AGEING | | | |
|---|---|---|---|---|---|---|---|---|---|
| | | T4 | | T8X | | T4 | | T8X | |
| AL-LOY | PMT (° C.) | YS (KSI) | % EI | YS (KSI) | % EI | YS (KSI) | % EI | YS (KSI) | % EI |
| AA 6111 | CON-TROL | 8.9 | 29 | 42.4 | 14 | 20.3 | 27 | 29.9 | 23 |
| | 130/130/240 | 16.1 | 29 | 44.4 | 14 | 20.8 | — | 39.9 | 19 |
| | 150/150/150 | 11.3 | 31 | 42.4 | 17 | 18.8 | 26 | 34.0 | 22 |

THREE CYCLES AND PREAGEING

The use of thermal spikes in combination with preageing at temperatures in the range of 55° to 85° C. for 8 hours or more provided material with an excellent combination of T4 and T8X properties, as shown in Table 5 below.

TABLE 5

EFFECT OF PREAGE PROCESS ON YIELD STRENGTH OF THREE CYCLE STABILIZED (130/130/240° C.) AA6010 AND AA6111 MATERIALS

| | | NO NATURAL AGEING | | | | ONE WEEK NATURAL AGEING | | | |
|---|---|---|---|---|---|---|---|---|---|
| | | T4 | | T8X | | T4 | | T8X | |
| AL-LOY | PRE-AGE ° C. - H | YS (KSI) | % EI | YS (KSI) | % EI | YS (KSI) | % EI | YS (KSI) | % EI |
| AA 6016 | CON-TROL | 11.2 | 35 | 35.2 | 16 | 16.2 | 30 | 31.2 | 21 |
| | 55 - 8 | 14.0 | 26 | 35.3 | 20 | 16.1 | 27 | 34.0 | 22 |
| | 70 - 8 | 14.4 | 28 | 35.1 | 21 | 15.4 | 26 | 34.3 | 22 |
| | 85 - 8 | 15.1 | 26 | 35.4 | 21 | 16.4 | 28 | 35.2 | 21 |
| AA 6111 | CON-TROL | 16.1 | 29 | 44.4 | 14 | 20.8 | — | 39.2 | 19 |
| | 55 - 8 | 19.1 | 23 | 43.3 | 17 | 21.5 | 22 | 41.9 | 17 |
| | 70 - 8 | 20.6 | 24 | 43.8 | 16 | 21.3 | 21 | 42.7 | 16 |
| | 85 - 8 | 22.3 | 16 | 44.5 | 18 | 22.0 | — | 44.7 | 17 |

These results show that the use of one or more thermal cycles in the temperature range of 100° to 240° C. after solution heat treatment improves the T8X temper properties of heat treatable aluminum alloys. The exact impact of the treatment depends on the type of alloy, the choice of maximum (spiking) temperature and the preaging conditions.

In the case of the particular alloys tested in this Example, the following conclusions can be reached:

AA6016

(a) a single low temperature spike (130°–240° C.) gives improved T8X response, although there is some loss of strength with natural ageing; the strength stabilizes at about 31 ksi.

(b) If the material is spiked at 240° C. followed by a preage ranging from 55° to 85° C. for 8 hours or more, the T8X strength increases to 35 ksi and stability against natural ageing is improved.

(c) The integrated treatments do not cause any loss of elongation and typical elongation values obtained are 25 to 30%.

AA6111

(a) Spiking at 240° C. is desired for the best effect but there is a loss of strength with natural ageing of about 5 ksi. Even so, the T8X strength after the loss caused by natural ageing, is higher than that of the control material.

(d) Preageing at temperature within the range of 55° to 85° C. for 8 hours reduces the loss caused by natural ageing. The T8X strength in this case is much improved (close to 45 ksi).

EXAMPLE 2

Table 6 below shows the average tensile properties of AA6111 and AAA6016 materials that were exposed to various thermal spikes and preageing treatments.

TABLE 6

EFFECTS OF THREE STEP STABILIZATION TREATMENT ON THE TENSILE PROPERTIES OF THE FRESHLY SOLUTION HEAT TREATED AA6111

| | AA 6111 | | | | AA 6016 | | | |
|---|---|---|---|---|---|---|---|---|
| | T4 | | T8X | | T4 | | T8X | |
| THERMAL HISTORY | YS (KSI) | % EI | YS (KSI) | % EI | YS (KSI) | % EI | YS (KSI) | % EI |
| SHT PLUS QUENCHED PLUS ONE WEEK @ ROOM TEMPERTURE (RT) (CONTROL) | 20.3 | 27 | 29.9 | 23 | 17.0 | 32 | 26.1 | 24 |
| SHT PLUS QUENCHED* PLUS STABILIZATION (105° C.) PLUS STABILIZATION II (130° C.} PLUS STABILIZATION III (240° C.) PLUS: | | | | | | | | |
| A) ONE WEEK @ RT | 22.7 | 23 | 44.9 | 15 | 14.0 | 27 | 31.3 | 19 |
| B) 5 H @ 85° C. AND NO HOLD @ RT | 24.4 | 24 | 46.4 | 17 | — | — | — | — |
| C) 5 × @ 85° C. AND ONE WEEK HOLD @ RT | — | — | — | — | 14.9 | 24 | 32.9 | 17 |

*COLD WATER FOR AA6111 AND FORCED AIR FOR AA6016

The Table also includes the data of the conventionally produced counterparts as well. As expected, it can be seen that both the materials show considerable improvement in yield strength in the T8X temper after one week at room temperature (RT). Preageing of the materials at 85° C. for 5 hours improves the yield strength even further in the T8X temper.

In commercial Solution Heat Treatment (SHT) practice, the solution heat treated material is subjected to a levelling operation. This operation is highly desirable to provide in an integrated line as well. In order to study the effect of such an operation, alloys AA6111 and 6016 were subjected to different amounts of stretching immediately after the SHT. Table 7 below summarizes the results of tensile tests.

The data suggests that stretching below 1% does not have any effect on the yield strength in the T4 and T8X tempers. However, above 1% stretch, the T4 strength increases and formability can be affected adversely.

This data suggests that the thermal spikes required to improve strength in T8X temper can be accomplished through the drying and curing steps that are used after the drying, pretreatment, preprime and high temperature coiling at the end of all operations.

TABLE 7

EFFECTS OF % STRETCH (PRIOR TO STABILIZATION TREATMENTS) ON THE TENSILE PROPERTIES OF THE SOLUTION HEAT TREATED AA6111 AND 6016 ALLOYS

| | AA 6111 | | | | AA 6016 | | | |
|---|---|---|---|---|---|---|---|---|
| | T4 | | T8X | | T4 | | T8X | |
| THERMAL HISTORY | YS (KSI) | % EI | YS (KSI) | % EI | YS (KSI) | % EI | YS (KSI) | % EI |
| SHT PLUS QUENCHED PLUS ONE WEEK @ RT (CONTROL) | 20.3 | 27 | 29.9 | 23 | 17.0 | 32 | 26.1 | 24 |
| SHT PLUS QUENCHED PLUS FORCED AIR QUENCHED PLUS STABILIZATION (105° C.) PLUS STABILIZATION II (130° C.) PLUS STABILIZATION III (240° C.) PLUS ONE WEEK @ RT | | | | | | | | |
| A) 0.2% | 21.2 | 24 | 43.9 | 16 | 14.9 | 23 | 33.3 | 16 |
| B) 0.5% | 21.6 | 21 | 43.7 | 15 | 16.6 | 24 | 33.8 | 17 |
| C) 1.0% | 22.9 | 23 | 44.4 | 16 | 17.8 | 30 | 34.9 | 15 |
| D) 2.0% | 24.1 | 20 | 45.2 | 15 | 18.8 | 16 | 34.9 | 16 |

What we claim is:

1. A [continuous] process of producing solution heat treated painted aluminum alloy sheet, *comprising*

(*a*) *performing a continuous process* which comprises, on a continuous basis, subjecting hot- or cold-rolled aluminum alloy sheet made from an aluminum alloy selected from the group consisting of Al-Mg-Si and Al-Mg-Si-Cu to solution heat treatment followed by quenching [and natural aging to cause age hardening and paint baking, wherein] *and*, before substantial age hardening has taken place after said quenching, *subjecting* the aluminum alloy sheet [is subjected] to at least one subsequent heat treatment involving heating the aluminum alloy sheet to a peak temperature in the range of 100° to 300° C., holding the aluminum alloy sheet at the peak temperature for a period of time of less than about 1 minute, and cooling the aluminum alloy sheet from the peak temperature to a temperature of 85° C. or less, and wherein, during said subsequent heat treatment, or during a last of said subsequent heat [treatment] *treatments* when there is more than one, said cooling involves [first] cooling said aluminum alloy sheet to a temperature in the range of 55° C. to 85° C. at a rate greater than or equal to 4° C./sec. [and then], (*b*) further cooling said aluminum alloy sheet to ambient temperature at a rate of less than or equal to 2° C./hour, (*c*) *and then subjecting said aluminum alloy sheet to natural aging to cause age hardening and paint baking*.

2. A process according to claim 1, wherein said aluminum alloy sheet is heated in said at least one subsequent heat treatment to a peak temperature within the range of 130°–270° C.

3. A process according to claim 1 wherein the aluminum alloy sheet is heated to said peak temperature in said at least one subsequent heat treatment at a rate of 10° C./minute or more.

4. A process according to claim 1 wherein the aluminum alloy sheet is heated to said peak temperature in said at least one subsequent heat treatment at a rate of 5° to 10° C./second.

5. A process according to claim 1 wherein the aluminum alloy sheet is cooled from said peak temperature in said at least one subsequent heat treatment at a rate of 25° C./second or more, at least to a temperature in the range of 55° to 85° C.

6. A process according to claim 1 wherein the aluminum alloy sheet is held at the peak temperature for a period of 5 seconds or less.

7. A process according to claim 1 wherein the aluminum alloy sheet is held at the peak temperature for a period of 1 second or less.

8. A process according to claim 1 wherein the aluminum alloy sheet has a temperature of 60° C. or less following said quenching and prior to said at least one subsequent heating step.

9. A process according to claim 1 having a single subsequent heating step involving a peak temperature within the range of 190°–300° C.

10. A process according to claim 1 having from 2 to 4 of said subsequent heating steps.

11. A process according to claim 1 having 3 of said subsequent heating steps.

12. A process according to claim 1 further comprising stretching said aluminum alloy sheet by an amount less than 2% following said solution heat treatment but before said at least one subsequent heat treatment.

* * * * *